US011187565B2

(12) United States Patent
Paterson et al.

(10) Patent No.: US 11,187,565 B2
(45) Date of Patent: Nov. 30, 2021

(54) DOSING APPARATUS AND A CONTAINER

(71) Applicant: Raepak Limited, Wymondham (GB)

(72) Inventors: Andrew John Paterson, Wymondham (GB); Gui Rendong, Zhejiang (CN); Yang Aiwen, Zhejiang (CN); Wang Gongfu, Zhejiang (CN); Mao Yin, Zhejiang (CN)

(73) Assignee: Berlin Packaging, LLC, Chicago, IL (US)

( * ) Notice: Subject to any disclaimer, the term of this patent is extended or adjusted under 35 U.S.C. 154(b) by 850 days.

(21) Appl. No.: 15/780,892

(22) PCT Filed: Oct. 14, 2016

(86) PCT No.: PCT/GB2016/053201
§ 371 (c)(1),
(2) Date: Jun. 1, 2018

(87) PCT Pub. No.: WO2017/093707
PCT Pub. Date: Jun. 8, 2017

(65) Prior Publication Data
US 2021/0293599 A1   Sep. 23, 2021

(30) Foreign Application Priority Data

Dec. 2, 2015   (CN) .......................... 201510873114.1
Dec. 2, 2015   (CN) .......................... 201520987148.9

(51) Int. Cl.
*G01F 11/06*   (2006.01)
*B65D 47/08*   (2006.01)
(Continued)

(52) U.S. Cl.
CPC .......... *G01F 11/06* (2013.01); *B65D 47/0804* (2013.01); *B65D 47/2031* (2013.01);
(Continued)

(58) Field of Classification Search
CPC ...... G01F 11/06; G01F 11/265; G01F 11/268; B65D 47/0804; B65D 47/2031; B65D 51/24; B65D 2547/063
(Continued)

(56) References Cited

U.S. PATENT DOCUMENTS 2,904,227 A * 9/1959 Graham .................. G01F 11/04
                                                    222/207
3,910,467 A * 10/1975 Nilson .................. G01F 11/082
                                                    222/449
(Continued)

FOREIGN PATENT DOCUMENTS

EP   2444782 A1   4/2012
GB   2201395 B    9/1988
(Continued)

OTHER PUBLICATIONS

International Search Report for International Application No. PCT/GB2016/053201 dated Dec. 19, 2016, 4 pages.
(Continued)

*Primary Examiner* — Patrick M. Buechner
*Assistant Examiner* — Michael J. Melaragno
(74) *Attorney, Agent, or Firm* — Adam K. Sacharoff; Much Shelist, P.C.

(57) ABSTRACT

A dosing apparatus suitable for dispensing a dose of liquid from a resilient squeezable container including a cap, suitable for attachment to the container, the cap comprising an expulsion channel for the expulsion of liquid; a dosage chamber attached to the cap, the dosage chamber comprising side walls; at least one inlet opening in the side walls proximal to the cap; a pressure chamber located underneath the dosage chamber; a valve provided at the end of the pressure chamber distal to the dosage chamber, the valve being movable from an open position, allowing liquid to
(Continued)

flow through one or more discharge openings, and a closed position where the valve closes each discharge opening, the valve incorporating at least one aperture; and a plunger provided in the dosage chamber, and movable relative to the dosage chamber so as to advance upon squeezing of the container, up to a blocking position.

7 Claims, 13 Drawing Sheets

(51) Int. Cl.
*B65D 47/20* (2006.01)
*G01F 11/26* (2006.01)
*B65D 51/24* (2006.01)

(52) U.S. Cl.
CPC ............ *B65D 51/24* (2013.01); *G01F 11/265* (2013.01); *G01F 11/268* (2013.01); *B65D 2547/063* (2013.01)

(58) Field of Classification Search
USPC ......................................................... 222/438
See application file for complete search history.

(56) References Cited

U.S. PATENT DOCUMENTS

| | | | |
|---|---|---|---|
| 4,811,871 A | 3/1989 | Wass et al. | |
| 5,152,434 A * | 10/1992 | Birmelin | B05B 11/3001 222/207 |
| 6,343,716 B1 * | 2/2002 | Baudin | G01F 11/04 222/207 |
| 6,394,315 B1 | 5/2002 | Banks | |
| 6,415,961 B2 * | 7/2002 | Bonningue | G01F 11/04 222/205 |
| 6,484,906 B2 * | 11/2002 | Bonningue | G01F 11/04 222/207 |
| 7,762,438 B2 * | 7/2010 | Skillin | B65D 47/0819 222/556 |
| 8,851,333 B2 * | 10/2014 | van de Poll | B05B 11/3067 222/207 |
| 10,159,998 B2 * | 12/2018 | Skillin | G01F 11/263 |
| 10,365,140 B2 * | 7/2019 | Koster | G01F 11/265 |
| 2003/0189067 A1 | 10/2003 | Stull et al. | |
| 2009/0302063 A1 * | 12/2009 | Maas | G01F 11/286 222/205 |
| 2012/0065608 A1 * | 3/2012 | Costello | B65D 47/2025 604/403 |
| 2012/0097714 A1 * | 4/2012 | Hoefte | G01F 13/006 222/477 |
| 2013/0270301 A1 * | 10/2013 | Schoubben | G01F 11/265 222/207 |
| 2014/0008398 A1 * | 1/2014 | Law | B05B 11/04 222/477 |
| 2015/0001260 A1 * | 1/2015 | Hoshino | B65D 83/48 222/481 |
| 2016/0311586 A1 * | 10/2016 | Santagiuliana | G01F 11/263 |
| 2017/0276531 A1 * | 9/2017 | Jaeckel | G01F 11/04 |
| 2018/0113016 A1 * | 4/2018 | Hoefte | B65D 47/30 |
| 2018/0113017 A1 * | 4/2018 | Hoefte | G01F 11/06 |
| 2018/0299310 A1 * | 10/2018 | Knight | G01F 11/265 |

FOREIGN PATENT DOCUMENTS

| | | |
|---|---|---|
| WO | 2005/049477 A3 | 6/2005 |
| WO | 2012171708 A1 | 12/2012 |
| WO | 2013158732 A1 | 10/2013 |
| WO | 2015/159078 A1 | 10/2015 |

OTHER PUBLICATIONS

International Written Opinion for International Application No. PCT/GB2016/053201 dated Dec. 19, 2016, 6 pages.

* cited by examiner

DOSING APPARATUS AND A CONTAINER

CROSS-REFERENCE TO RELATED APPLICATIONS

This application is a national phase entry under 35 U.S.C. § 371 of International Patent Application PCT/GB2016/053201, filed Oct. 14, 2016, designating the United States of America and published in English as International Patent Publication WO 2017/093707 A1 on Jun. 8, 2017, which claims the benefit under Article 8 of the Patent Cooperation Treaty to Chinese Patent Application Serial Nos. 201520987148.9 and 201510873114.1, filed Dec. 2, 2015.

TECHNICAL FIELD

This application relates to an apparatus suitable for dispensing regular doses of a liquid from a dosing cap. The application further relates to containers comprising a dosing apparatus.

BACKGROUND

Liquids are often kept in bottles that are sufficiently flexible to be squeezed by an operator with either simple or valve-controlled spouts, to enable straightforward dispensing of their contents. The relative costs of products, their potential high concentration and their impact on the environment creates a desire to only use the required amount of product for the task. One of the limitations of the classic bottle design, is the difficulty in using the exact amount of force required to dispense the volume of liquid desired. As a result, several systems have been developed that produce exact metered out doses of their liquid contents each and every time the bottle is squeezed.

These systems often use a multiplicity of chambers functionally connected, so that, during the pouring process, one of the chambers will fill to the desired volume. This volume will then be transferred to the dispensing chamber where it can be dispensed. The limitation of such systems is the requirement for multiple chambers of a size suitable for housing the desired dosing volume. This makes the dosing equipment more bulky in size and complex to produce. A second limitation of such designs is that they often require separate inversions of the bottle to effectively fill the measuring chamber before the fluid can be dispensed. This slows and further complicates the dispensing process.

More recent advances have utilized a single chamber design to eliminate these limitations. WO 2013/158732 discloses a design with a single dosing chamber with integral inlet openings to allow the liquid to enter the chamber. A valve at the base of the chamber and proximal discharge openings allow the pressure produced by squeezing the bottle to force an internal piston toward the outlet opening, thus dispensing the liquid contained in the dispensing chamber.

This design, however, has its own inherent limitations, which the current disclosure seeks to overcome.

BRIEF SUMMARY

In a first broad independent aspect, the disclosure provides a dosing apparatus suitable for dispensing a dose of liquid from a resilient squeezable container, comprising:
- a cap, suitable for attachment to the container, the cap comprising an expulsion channel for the expulsion of liquid;
- a dosage chamber attached to the cap, the dosage chamber comprising side walls extending from the cap, at least one inlet opening in the side walls proximal to the cap;
- a pressure chamber located underneath the dosage chamber;
- a valve provided at the end of the pressure chamber distal to the dosage chamber, the valve being movable from an open position, allowing liquid to flow through one or more discharge openings, and a dosed position where the valve doses each discharge opening, the valve incorporating at least one aperture; and
- a plunger provided in the dosage chamber, and movable relative to the dosage chamber so as to advance upon squeezing of the container, up to a blocking position.

This is advantageous because it does not require a separate collection chamber to meter out doses of liquid, allowing it to remain compact. In addition, the pressure chamber is particularly advantageous because it creates a time lag between the creation of pressure on the container and the transmission of that full pressure to the plunger. This enables the dosing chamber to fill with liquid before the pressure on the plunger causes it to move along the dosing chamber and engage, in certain embodiments, with a slit valve, sealing it. The pressure chamber also ensures that the pressure on the plunger is even and consistent. The pressure on the plunger is created by the movement of a large body of liquid contained within the pressure chamber and the force on the back of the plunger will, therefore, be even across its surface area. By contrast, if the plunger is disposed directly on the pressure apertures, the influx of liquid through those pressure apertures would create uneven force on the plunger, increasing the chance of the plunger rotating within the dosing chamber and becoming blocked.

In a subsidiary aspect, the dosing apparatus further comprises an insert with a slit valve that is provided between the cap and the dosage chamber. This reduces, or even in certain embodiments eliminates, any undesirable dribbling from the container after dispensing the dose.

In a further subsidiary aspect, the insert incorporates a tubular portion projecting away from the slit valve; the plunger interacting with the lower extremity of the tubular portion when the plunger is in use at the end of the dosage chamber proximal to the cap. This facilitates a separation between the slit valve and the plunger.

In a further subsidiary aspect, the insert includes a skirt that partially covers the inlet openings. This configuration advantageously allows the insert to control the flow rate into the dosage chamber. It is also particularly advantageous since it can at least partially block the inlet openings so that the plunger more readily returns once the dose has been dispensed.

In a further subsidiary aspect, the pressure chamber has a smaller diameter than the dosage chamber in order to form a flange against which the plunger rests in its lowermost position. This configuration advantageously removes any requirement of providing a base while defining the dosage chamber with accuracy.

In a further subsidiary aspect, the valve incorporates a disc attached to the pressure chamber by one or more retaining means. This provides a particularly compact and responsive structure.

In a further subsidiary aspect, the retaining means incorporates one or more tines that extend against the inner surface of the pressure chamber. This allows the valve to be retained by the inherent flexibility in tines of this kind. It also advantageously allows displacement of the valve without any components located outside of the pressure chamber.

In a further subsidiary aspect, the tines incorporate a hook and the pressure chamber incorporates a lower ledge at least partially extending around the inner diameter of the chamber in order to retain the tines when the valve is, in use, in an open position. This advantageously secures the valve without requiring additional components since the shape of the chamber itself can be used to facilitate the retention of the valve.

In a further subsidiary aspect, the disc has an upper surface that abuts, in use, against the distal extremity of the pressure chamber when in the closed position. This provides a relatively large potential area for a discharge from the contents of the chambers.

In a further subsidiary aspect, the disc has a diameter greater than the external diameter of the pressure chamber. This allows advantageous sealing and release from its abutting sealing position to improve the response of the valve.

In a further subsidiary aspect, the plunger incorporates a domed lowermost portion. This configuration increases the area that can be pressurized for improved performance of the plunger.

In a further broad aspect, the disclosure provides a container comprising a dosing apparatus according to any of the preceding aspects.

Preferably, the dosing apparatus includes a slit valve provided between the cap and the dosage chamber. This is particularly advantageous because it prevents liquid from leaking out of the expulsion channel when it is not desired. The slit valve is only opened when the internal pressure exceeds a given threshold, creating a selective opening mechanism and prevention of accidental spillage.

Preferably, the plunger is able to interact with the slit valve functionally blocking the slit valve when at the end of the dosage chamber proximal to the cap. This is particularly advantageous because it means the plunger provides both a means of forcing the collected liquid out of the dosing chamber and a means of blocking exit from the dosing apparatus when the plunger reaches the end of the dosing chamber and the desired dose has been metered out. This removes the requirement for more complex and bulky mechanisms for cutting off the flow of liquid when the desired dose had been metered out.

Preferably, the slit valve includes a skirt that partially covers the inlet openings. This is particularly advantageous because it enables the size of the inlet openings to be altered and consequently the volume of dose, without alteration to the housing of the dosing apparatus or inlet openings themselves. This enables the same dosing apparatus to be used to create alternative doses by only changing the slit valve. In certain embodiments, since the skirt is located inside the inlet opening and since it is inherently flexible, it can bend to allow liquid to fill the chamber and can abut against the surrounding portion of the inlet opening after the dose has been dispensed and the air travels into the container after the squeezing of the container.

Preferably, the pressure aperture is centrally located in the valve. This is advantageous because it helps to ensure even pressure is created on the base of the plunger, reducing the likelihood that it rotates within the dosing chamber. In a preferred embodiment, it also allows the use of a single aperture, which reduces the complexity of the structure.

Preferably, the pressure chamber is of decreased volume when compared to the dosage chamber. In certain embodiments, this is advantageous because it prevents the time lag created by the dosage chamber from extending beyond the maximum amount of time the dosing chamber may take to fill. The size of the inlet openings are larger than the pressure aperture and, therefore, if the pressure chamber and the dosing chamber were of equal volume, the dosing chamber would be full of liquid long before the pressure chamber.

BRIEF DESCRIPTION OF THE FIGURES

Non-limiting example embodiments of the invention will now be described, by way of example only, with reference to the accompanying drawings.

FIG. 7 shows a perspective view of a cap equipped with a dosing apparatus.

DETAILED DESCRIPTION

Figure 1:
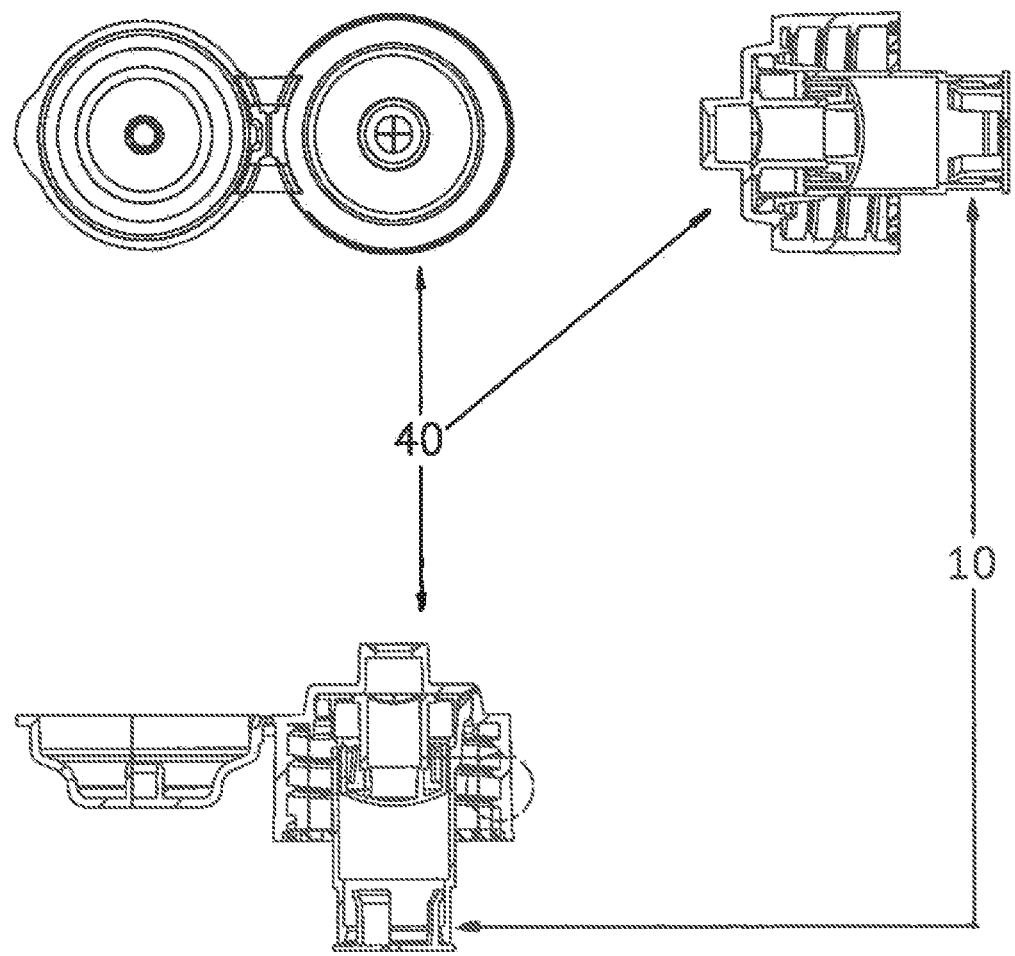
FIG. 1 shows a dispensing apparatus in perspective view, in cross-sectional view, in side views and in an upper elevation.

FIG. 1 shows the dispensing apparatus 10, operably attached to the cap 40. The dispensing or dosing apparatus 10 and cap 40 are suitable for attachment to a resilient squeezable container, capable of storing a given liquid.

Figure 2:
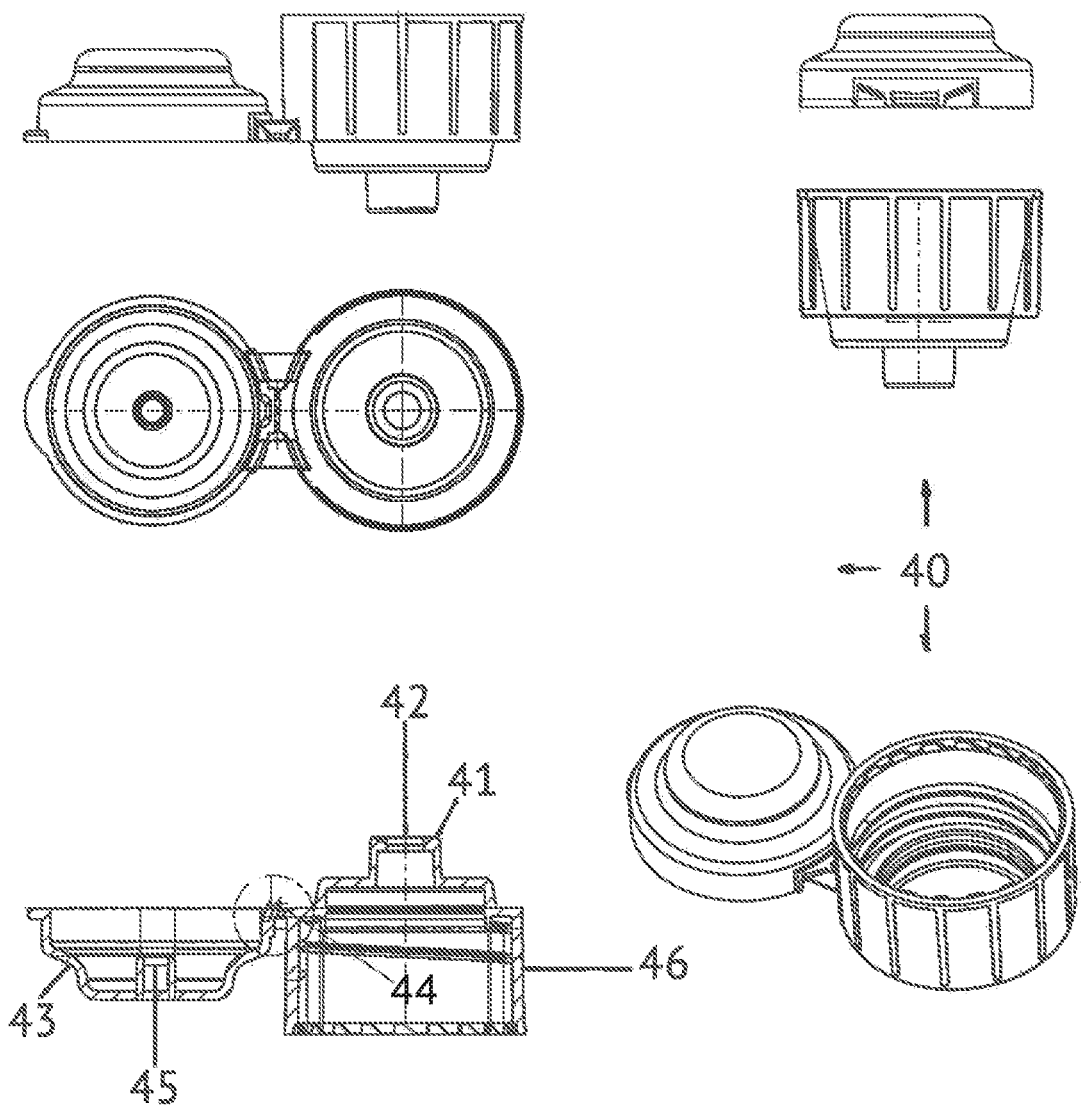
FIG. 2 shows a cap in perspective view.

FIG. 2 shows the cap 40, with the lid 43 in an open configuration. At the center of the cap 40 is an expulsion channel 41 with aperture 42 through which liquid contained in the dosing chamber 11 (see FIG. 3) can pass. The cap 40 can be securely attached to a resilient squeezable container by the attachment means 46. Preferably, the attachment means 46 are interlocking male and female threaded regions on the inner surface of the cap 40 and the outer surface of the container, respectively. Alternatively, the attachment means 46 could be a frictional fit or a push-fit mechanism.

A lid 43 is attached to the cap 40 by a hinge region 44. A sealing means 45 on the base of the lid 43 enables the aperture 42 in the cap 40 to be securely sealed when the lid 43 is in a closed configuration on the cap 40. In the currently displayed embodiment, the sealing means 45 consists of a cylinder so shaped that when the lid 43 is in a closed configuration, the cylinder enters the aperture 42, producing a frictional fit with the inner surface of the expulsion channel 41, effectively sealing it. Those skilled in the art would be aware that alternative means of sealing the outlet tube are available.

Figure 3:
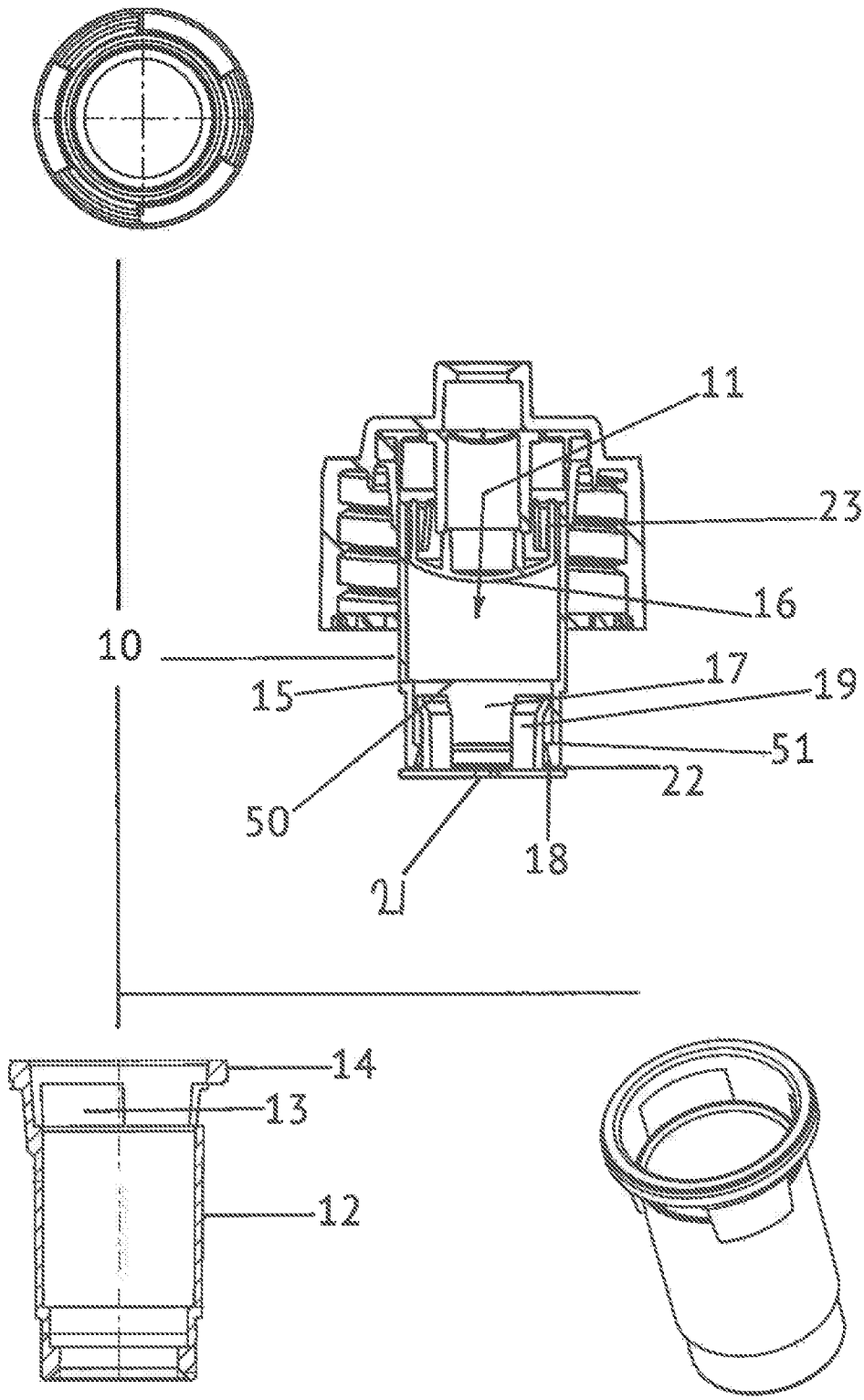
FIG. 3 shows a dispensing apparatus when attached to the cap, in perspective view when separate from the cap, in cross-sectional view and in an upper elevation.

The dosing apparatus 10 as shown, for example, in FIGS. 1 and 3, is operably attached to the cap 40 due to the close frictional fit of the upper ring 14 with the inner surface of the base of the cap 40. An annular lip may be provided in one or more downwardly projecting walls to secure upper ring 14 to the inside of the cap.

In addition, a flexible insert may be secured on the inside of the cap above the dosing chamber.

FIG. 3 shows a cross-sectional view of part of a dosing apparatus 10, consisting of a cylindrical dosing chamber 11, with inlet openings 13 in the side wall 12 proximal to the upper ring 14, a plunger 16 for forcing liquid into and out of the dosing chamber 11, a pressure chamber 17, and a valve 20 with a central pressure aperture 21. Optionally, the valve 20 is a disc valve with peripheral tines or hooks 26 to attach the valve 20 to the dosing apparatus 10 (see e.g., FIG. 5).

Alternatively, the valve 20 could be attached to the dosing apparatus 10 by a central attachment means or external holdings.

In one embodiment, there are three rectangular inlet openings 13, with upper edges defined by upper ring 14. The size of the inlet openings 13 is proportional to the desired volume of the dose. The volume of the combined inlet openings, in combination with the viscosity of the liquid within the container, helps define the volume of dose created. Those skilled in the art will be aware that the inlet openings 13 are not constrained by their shape or number. The inlet openings 13 could be square, circular or triangular, with the combined volume not the number being important to the functioning of the embodiments of the invention.

Directly beneath the dosing chamber 11, as oriented for use, is a cylindrical pressure chamber 17. The pressure chamber 17 is of a volume smaller than that of the dosing chamber 11. At the junction between the dosing chamber 11 and the pressure chamber 17 is a ridge or flange 15. Preferably, the ridge 15 is internally chamfered so that in use, no liquid can accumulate on the ridge 15 and interfere with the plunging mechanism. A plunger 16 is inside the dosing chamber 11.

Figure 4:
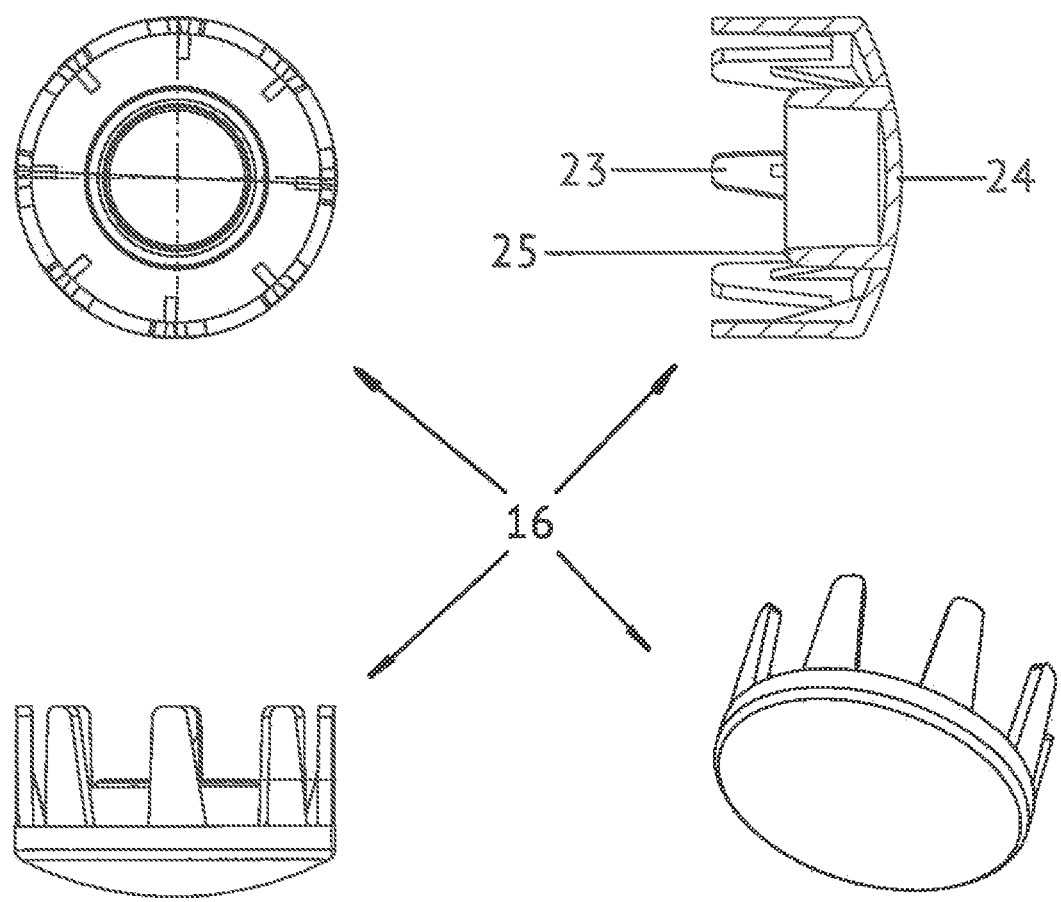
FIG. 4 shows a plunger in perspective view, in side elevation, in cross-sectional view and in an upper elevation.

FIG. 4 shows a perspective view of a first embodiment of the plunger 16. The plunger 16 has a concave domed base with a diameter larger than that of the aperture 50 created by the ridge 15, but smaller than that of the dosing chamber 11. As a result, the plunger 16 can move relative to the dosing chamber 11 (or primary chamber) but cannot enter the pressure or secondary chamber 17, where it rests on the ridge 15. The domed shape of the plunger 16 helps to ensure that the plunger 16 does not rotate around its horizontal axis. The force created by the liquid entering the pressure chamber 17 will be pushed to the peripheries of the plunger 16 helping to stabilize the plunger 16. At rest, the plunger 16, rests on the ridge 15 and defines the boundaries of the dosing or primary chamber 11 and the pressure or secondary chamber 17. When orientated with the cap 40 at the top of the dosing chamber 11, the plunger 16 can only move in a vertical direction relative to the dosing chamber 11. Around the periphery of the plunger 16 are projections 23 extending away from the plunger 16 in a substantially perpendicular direction relative to the plane of the domed portion 24 of the plunger. The projections 23 help to prevent the plunger 16 from rotating around the horizontal axis of the plunger 16 and becoming stuck in the dosing chamber 11. The projections 23 help reduce the surface area of the plunger 16 in contact with the dosing chamber 11, reducing the drag the plunger 16 experiences as it moves relative to the dosing chamber 11.

At the center of the plunger 16 on the face proximal to the cap 40, is a plug 25. The plug 25 will interact with and seal the expulsion channel 41 when the plunger 16 reaches the end of the dosing chamber 11 proximal to the cap 40. In the current embodiment, the plug 25 is a cylinder that interacts with a tubular portion 32 of the insert, which carries the slit valve 27 as best seen in FIG. 6.

Figure 5:
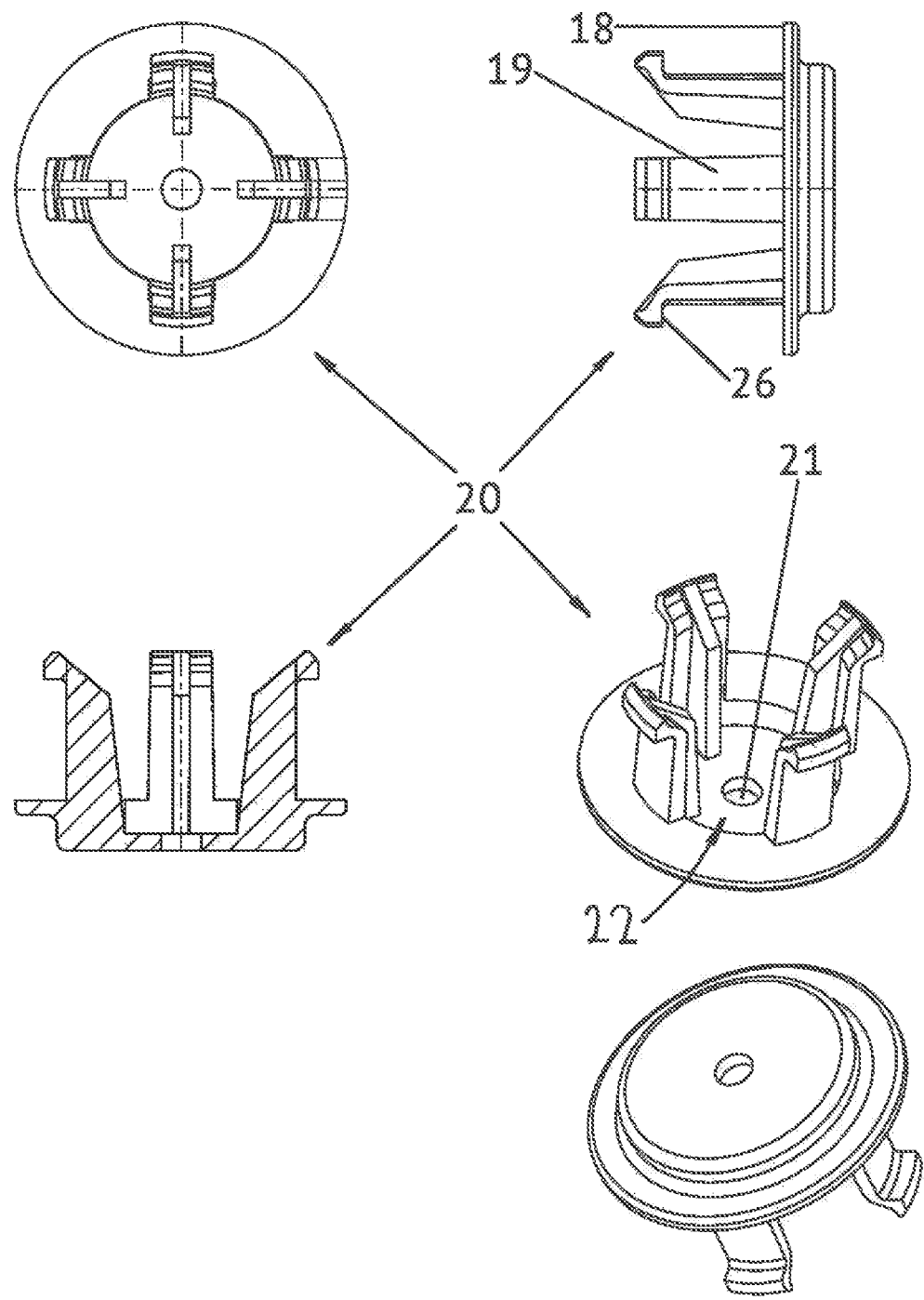
FIG. 5 shows a disc valve in perspective view, in an upper elevation, in a cross-sectional view and in a side elevation.

FIG. 5 shows a perspective view of a first embodiment of the valve 20. The current embodiment of the valve 20 is a disc valve. The disc valve 20 is attached at the base of the dosing apparatus 10 and controls the discharge of liquid from the dosing chamber 11 via the discharge openings 22 and the influx of liquid into the pressure chamber 17 via the pressure aperture 21.

The valve 20 has arms 19 at the periphery of a circular base 18, extending away perpendicular to the base 18. At the end of the arms or tines 19, distal from the base 18, are hooks 26, which are suitable to catch the ridge 15 at the base of the pressure chamber 17. At the center of the valve 20 is a pressure aperture 21. The diameter of the pressure aperture 21 is proportional to the volume of the dose required and the volume of the pressure chamber 17. The diameter of the pressure aperture 21 is also determined by considering the viscosity of the liquid contained in the resilient squeezable container. In an alternative embodiment, there is more than one pressure aperture 21 in the valve 20. The valve 20 can move from an open position, allowing liquid to flow through the one or more discharge openings 22, and a closed position where no liquid can flow through the discharge openings 22. In the open configuration, the valve 20 is supported by the interaction of the hook 26 with the inner surface of the ridge 15. The discharge openings 22 are defined at their upper surface by the ridge 15, at their lower surface by the circumference of the base 18, and at the sides by the arms 19 of the valve 20. In its closed configuration, the base 18 of the valve 20 comes into contact with the ridge 15. The arms 19 and the hooks 26 of the valve 20 are enclosed within the pressure chamber 17, effectively closing the discharge openings 22.

Figure 6:
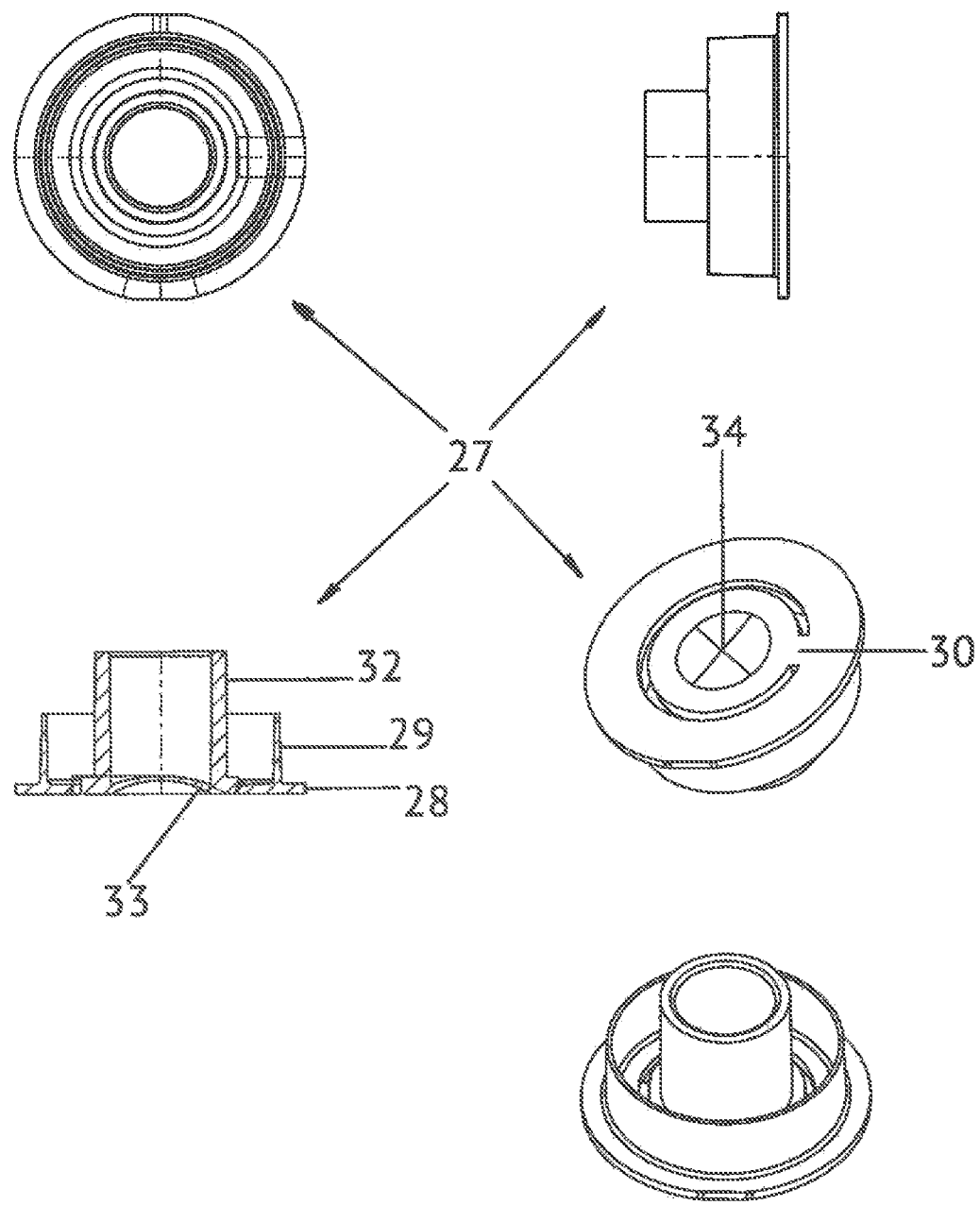
FIG. 6 shows a slit valve in multiple perspective views, in a cross-sectional view, in side elevation, and in an upper elevation.
Figure 4:
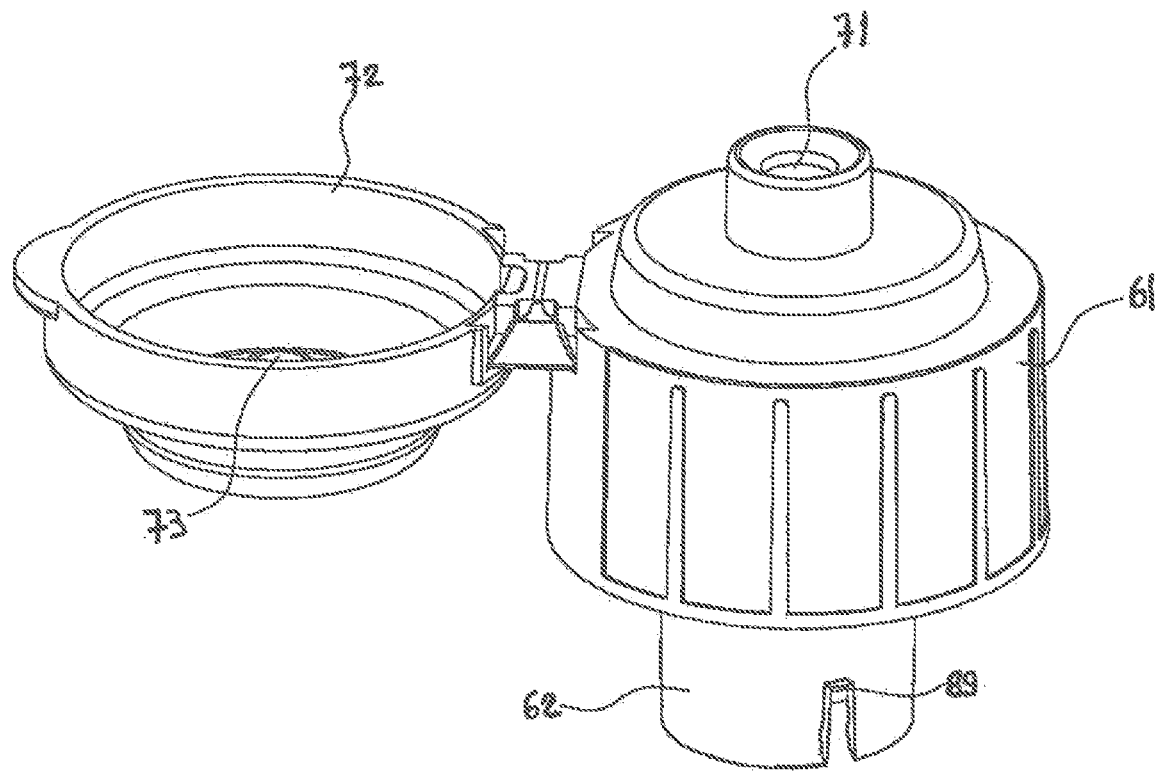

FIG. 6 shows a first embodiment of an insert that carries a slit valve 27 as shown in multiple views. The slit valve 27 is housed in the upper ring 14 at the end of the dosing apparatus 10 and forms the boundary between the aperture 42 of the expulsion channel 41 and the dosing chamber 11. In a preferred embodiment, the slit valve 27 is made from a flexible polymeric material, preferably of silicone or other like materials. The slit valve 27 comprises a central head region 33 and a radial outer portion 28, attached by a connection tag 30, allowing the head region 33 and the radial outer portion 28 to move independent of each other while still attached due to a spacing provided between the two movable components and the inherent flexibility of the material employed. At the center of the head region 33 are self-sealing slits 34, which together define a closed orifice when the slit valve 27 is in a closed configuration. The self-sealing slits 34 may be preferentially opened in one direction, allowing liquid to move from within the dosing chamber 11 to the exterior but not in the reverse direction. A cylindrical projection 32 extends from the head region 33 in a perpendicular direction. In use, the cylindrical projection 32 can interact with the plug 25, effectively sealing the slit valve 27 and preventing liquid in the resilient squeezable container from exiting through the expulsion channel 41.

A skirt region 29, extends perpendicular from the radial outer portion 28 when orientated as shown in FIG. 6. In use, the skirt portion 29 interacts with the inner surface of the upper ring 14 attaching the slit valve 27 to the dosing apparatus 10. In one embodiment, the skirt portion 29 partially covers the inlet openings 13, altering the volume of the inlet openings 13 and, therefore, altering the volume of liquid dose metered out. By altering the size of the skirt portion 29, it is, therefore, possible to alter the size of dose metered out without altering other components of the dosing apparatus. In a preferred embodiment, the skirt portion 29 is of uneven size, creating the ability to alter the volume of the inlet openings by rotating the slit valve insert 27.

In use, the squeezable container—with cap 40 and dosing chamber 11 securely attached—is inverted, and the container is squeezed. The squeezing of the container decreases the volume of the container and, therefore, increases the pressure within the container.

Concurrently with this increase in the pressure, the change in orientation and, therefore, the change in the direction of gravity, causes the valve 20 to enter its closed configuration, closing the discharge openings 22. The orientation and the increased internal pressure will cause liquid to enter the inlet openings 13 and fill the dosing chamber 11. Concurrently, liquid will be forced through the pressure aperture 21, filling the pressure chamber 17. The size of the pressure chamber 17 and the size of the pressure aperture 21 work in combination to define how long the pressure chamber 17 takes to fill with liquid. When the pressure chamber 17 is full of liquid, pressure will push the plunger 16 along the dosing chamber 11 from its position proximal to the pressure chamber 17 to a position proximal to the cap 40. The movement of the plunger 16, will cause liquid that has entered the dosing chamber 11 via the inlet openings 13, to exit through the slit valve 27 and out of the expulsion channel 41. When the plunger 16 reaches the end of the dosing chamber 11, proximal to the cap 40, the plug 25 will interact with the cylindrical projection 32, sealing the slit valve 27 and preventing any more liquid from exiting from the expulsion channel 41.

By controlling features, such as the volume of the dosing chamber 11 and the volume of the inlet openings 13, it is possible to create consistent doses of liquid. In certain modes of operation, the current system further uses a time lag between the initiation of pressure on the container and the initiation of pressure on the plunger 16 within the dosing chamber 11. This is due to the pressure chamber 17, which fills with liquid before transmitting pressure on the plunger 16. By altering the ratio of the size of the pressure chamber 17 and the pressure aperture 21, it is possible to alter the time the pressure chamber 17 takes to fill with liquid. The time lag allows liquid to enter through the inlet openings 13 and fill the dosing chamber 11 to a consistent level.

In certain modes of use, when the resilient squeezable container is righted and the pressure on it released, the container will return to its original configuration. This increase in volume will cause the pressure within the container to decrease and external air will enter through the expulsion channel 41 and through the slit valve 27, filling the dosing chamber 11 with air. The change in gravity and pressure will cause the plunger 16 to move relative to the dosing chamber 11 away from the cap 40 until it is resting on the ridge 15. The plug 25 will no longer be in contact with the cylindrical projection 32, unsealing the slit valve 27.

The valve 20 will move from a closed to an open configuration, opening the discharge openings 22. The liquid in the pressure chamber will exit through the discharge openings 22, returning the dosing apparatus 10 to its pre-use configuration.

In a preferred embodiment, the change of pressure when the container is released is sufficient to move the plunger 16 from its location proximal to the cap 40 to a position proximal to the pressure chamber 17. This has the added benefit that the chamber is ready to be filled by fluid again via the inlet openings 13 and the dosing apparatus 10 does not necessarily need to be rotated between uses.

Other Embodiments of the Disclosure

This section provides further examples of a dosing apparatus for dispensing a dose of liquid from a resilient and, thus, squeezable container. These, in particular, concern improvements to a bottle cap that comprises a first outlet toward the top of the cap. The cap comprises means for attachment to a container, such as a bottle. These may take the forms described in the preceding section. A dispenser housing or dosing chamber is attached to the cap. It allows liquid into the chamber primarily through a first inlet located toward the upper portion of the dispenser housing. The dispenser housing also incorporates a second inlet located toward the bottom of the dispenser housing.

Figure 8:
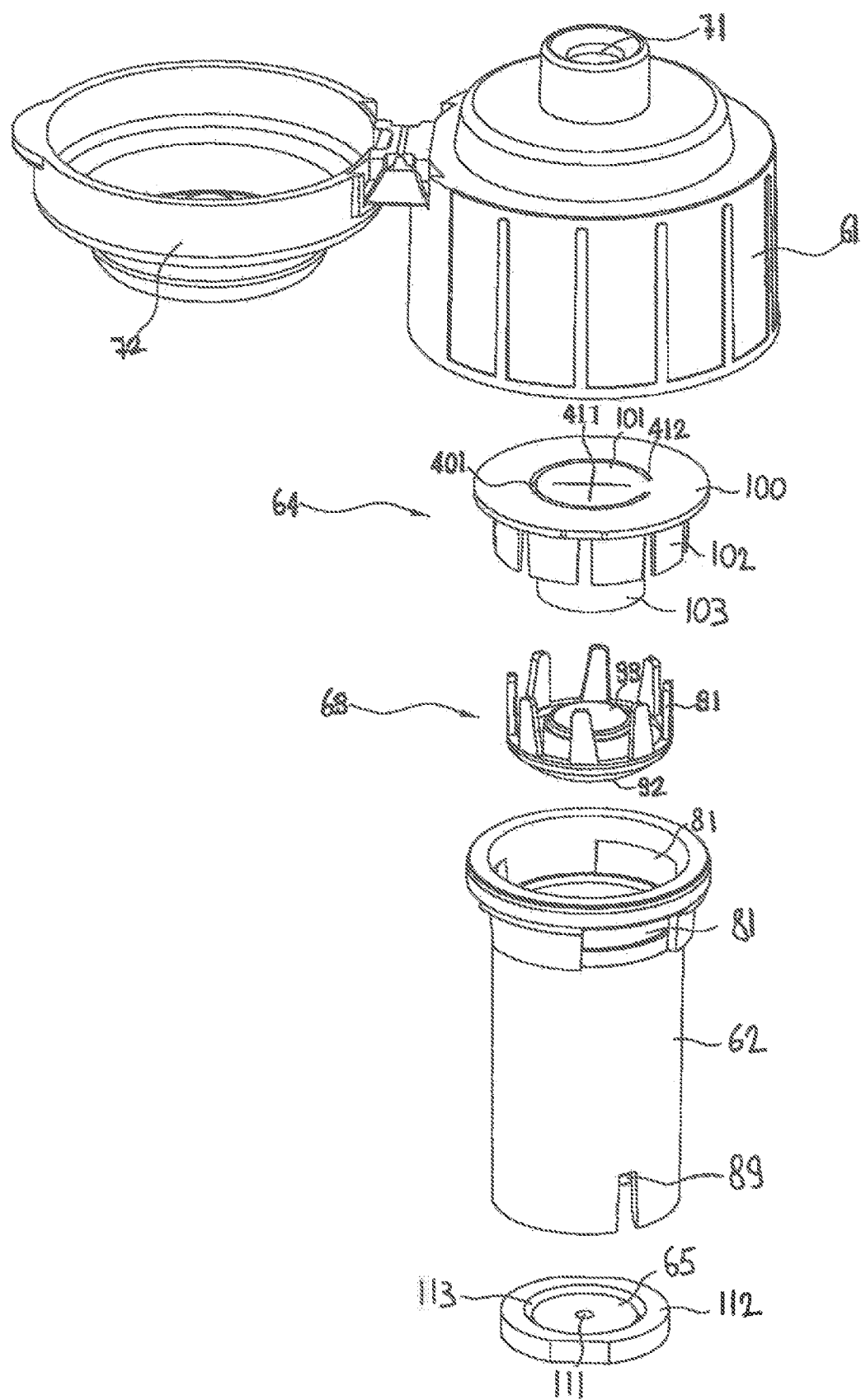
FIG. 8 shows perspective views of the various disassembled components of the embodiment of FIG. 7.
Figure 9:
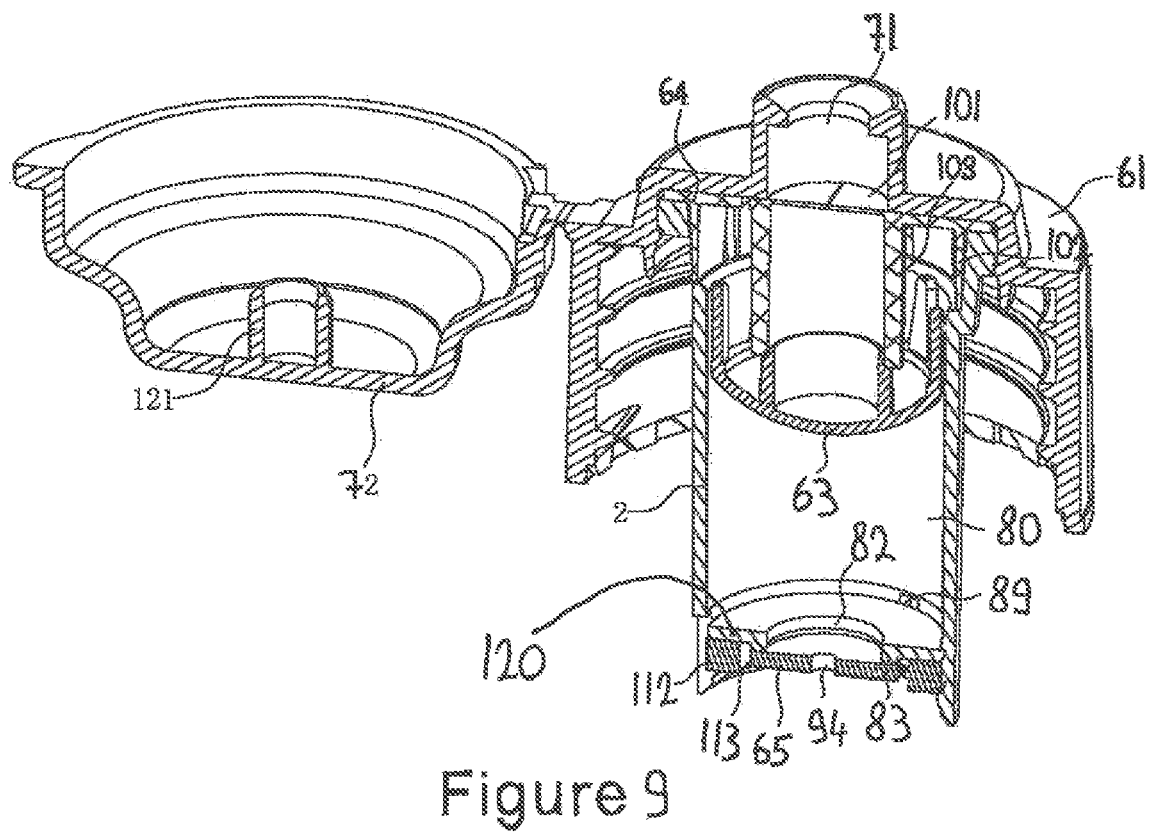
FIG. 9 shows the cross-sectional view of the embodiment of FIGS. 7 and 8.
Figure 10:
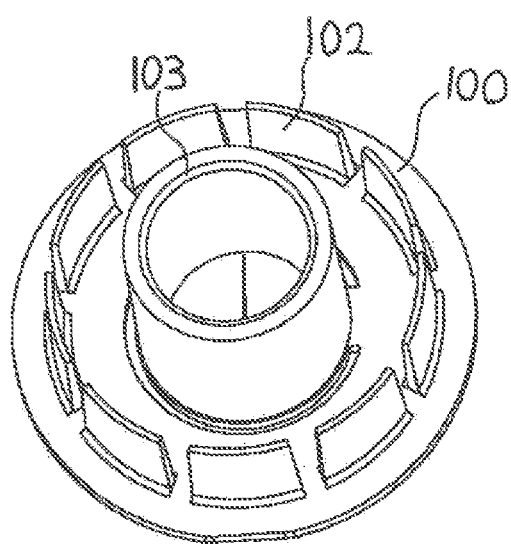
FIG. 10 shows a perspective view of the underside of the valve body.
Figure 11:
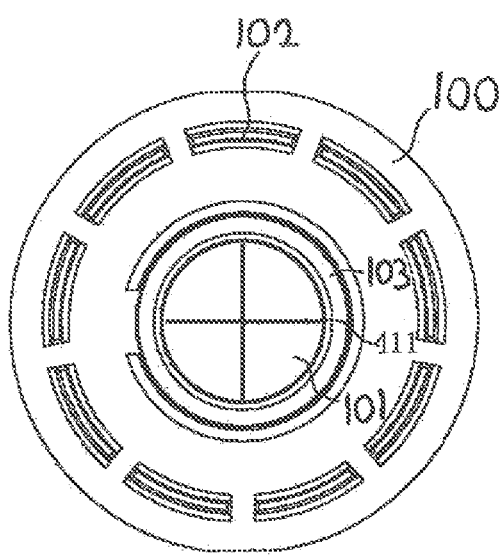
FIG. 11 shows a top view of the valve body.

A plunger or a piston 88 is displaced up and down within the dispenser housing 62. In its upper position, it substantially seals tube 103 and, when in its lowermost position, it substantially seals the bottom inlet 111 (see FIG. 8). In addition to the cap and the housing, a substantially elastic or flexible insert or valve 64 is suitable for connecting on the inside surface of the bottle cap. The elastic valve 64 includes a valve body, which is sized and configured in accordance with the size of the first outlet 71. The valve body of valve 64 is sufficiently flexible to adopt several configurations so that it is open when positive pressure is applied and closed when negative pressure is present. The valve 64 may advantageously take the form of a cross valve 101. In other words, the aperture is formed by two perpendicularly bisecting lines that may form a through-hole dependent upon the pressure conditions applied on the valve. The top surface and edge of the valve body are designed to fit against an inner portion of the bottle cap 61 and to be secured into place by the upper perimeter of the dispenser housing 62. In a preferred embodiment, the cross valve 101 may be secured on the inner side of the first outlet 71. In addition, the valve body 64 also incorporates an output pipe that is secured under the cross valve. The cross valve 101 also at least partially obstructs the upper openings in the dispenser housing 62. These take the form of flaps or wings 102, which also extend downward and are sufficiently flexible to allow liquid to get through when the bottle is squeezed. As previously indicated, the output pipe projects downward during use. In a further subsidiary aspect, a flow restriction disc 65 may be secured within the dispenser housing 62. This flow restriction disc 65 may be employed to seal the second inlet 82 (FIG. 9). The flow restriction disc 65 has a second or third inlet 94 (FIG. 9), which also allows liquid to flow into the dispenser housing 62.

Figure 19:
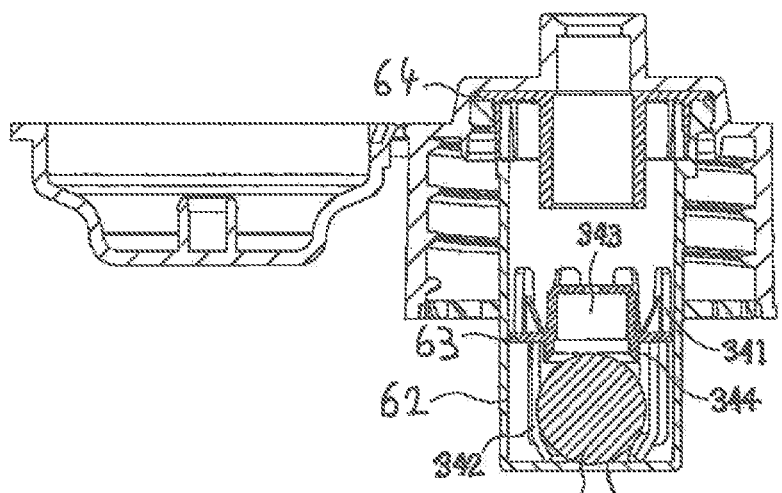
FIG. 19 shows a further embodiment with both a dosage chamber and a pressure chamber.

The flow restriction disc 65 may be elastically detached to connect with a connecting ring 112 provided at the bottom of the dispenser housing 62. The flow restriction disc 65 optionally comprises an outer loop or connecting ring 112 and an inner loop defining a gap 113. The outer annular portion 83 of the second inlet 82 (FIG. 9) may have a downward convex configuration. In use, the flow restriction disc 65 interacts with the convex ring or outer annular portion 83. In addition, one or more modulating orifices or timing orifices 89 may be provided in a lower side portion of the dispenser housing 62. These timing orifices allow a connection with the inner chamber of the dispenser housing, which can assist in modulating the volume of the output. In a subsidiary aspect, the piston may incorporate a float or other buoyancy aid to facilitate its displacement in use. In addition, optionally, the bottom of the piston 63 may incorporate a downward dome 92. Furthermore, the piston 63 may incorporate an upper central region shaped and configured to fit against the lower portion of the tube 103 in order to seal or close the first outlet of the bottle cap. Optionally, the float may take the form of a floating ball, which may itself provide the surface to seal the first outlet when the piston is in its upper position. Optionally, it may also be configured to seal the second inlet when the piston is in its lower position. Further optionally, the float may be positioned within float retaining means such as elastic claws 342 (FIG. 19). The elastic claws 342 or retaining means may be configured to encircle the float or ball 96 (FIG. 19) in order to allow it to move up and down freely in order to fulfill its upper and lower blocking functions. In a further subsidiary aspect, a platform may be formed integrally with the inside of the wall of the dispenser housing allowing liquid to go through it. The floating part can go up and down freely in the secondary chamber located above the platform. Optionally, a float or ball 96 may be secured into place between the platform and the bottom of the dispenser housing.

In certain embodiments, the dosage dispenser is particularly advantageous because it allows accurate liquid dosage dispensing with a wide range of liquid viscosities. Embodiments of the disclosure are also particularly advantageous in terms of simplification. Furthermore, in certain embodiment, drips are substantially prevented in order to allow the dispensing chamber to be filled before any liquid can inadvertently drip out of the bottle. Embodiments of the disclosure may be suitable for liquids whose viscosity range from 1 to 2000 mPa.s.

FIGS. 7 to 13 show a bottle cap 61 with the following features: a dispenser housing 62, a piston 63, an elastic valve 64, a first outlet 71 in the top portion of the bottle cap 61, and a flip top 72, which is hingedly secured to the bottle cap 61. The flip top 72 covers and/or seals the top of the orifice of the first outlet 71 by employing a mating boss 73. This configuration also prevents any dirt and/or dust contaminating the first outlet 71. The dispensing or dispenser housing 62 has an inner chamber 80 (see FIG. 9), which allows the amount of liquid to be measured. The dispensing housing 62 is configured to connect to the inner side of the top of the bottle cap 61. The inner portion of the first outlet 71 is, in effect, surrounded by the dispenser housing 62, which is secured to the underside of the cap 61 by push fit means. The dispenser housing 62 comprises an inlet 81 in the form of several rectangular apertures located in the uppermost portion of the dispenser housing 62. The dispenser housing has a lower inlet 82 located in the lower portion of the dispenser housing. A flow restriction disc 65 is placed at the bottom of the dispenser housing 62 in order to selectively seal the second inlet 82. In the central region of the flow restriction disc 65, there is provided a third inlet 94 that allows the liquid to flow into the inner chamber 80. The flow restriction disc 65 is preferably resilient and/or detachable in order to connect with a connecting ring 112. An annular gap 113 is provided between the flow restriction disc 65 and the connecting ring 112. In a preferred embodiment, the flow restriction disc 65 and the connecting ring 112 are integrally formed. This may be achieved by the process of molding a single component. The flow restriction disc 65 may be thinner than the connecting ring 112 for extra flexibility and to allow it to more readily open and close as appropriate.

Figure 12:
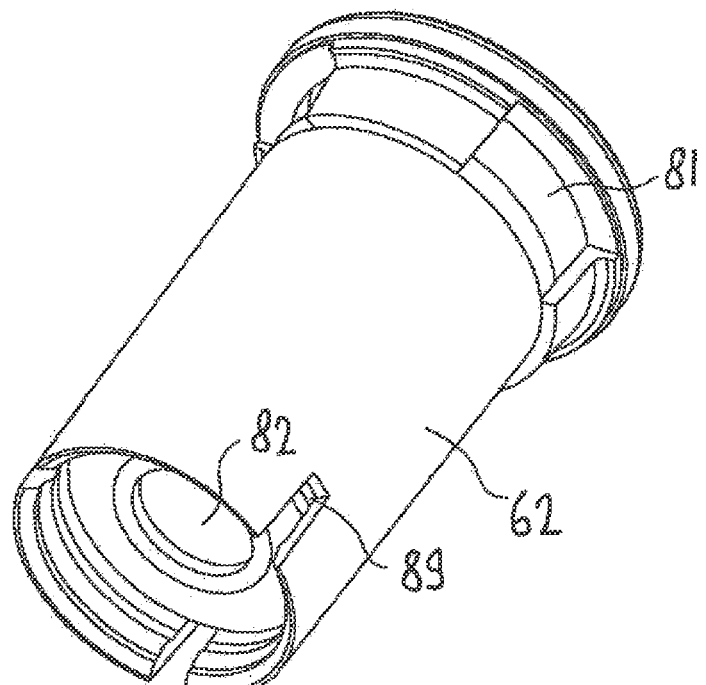
FIG. 12 shows a perspective view of the outside of the cylinder defining the dosing chamber.
Figure 13:
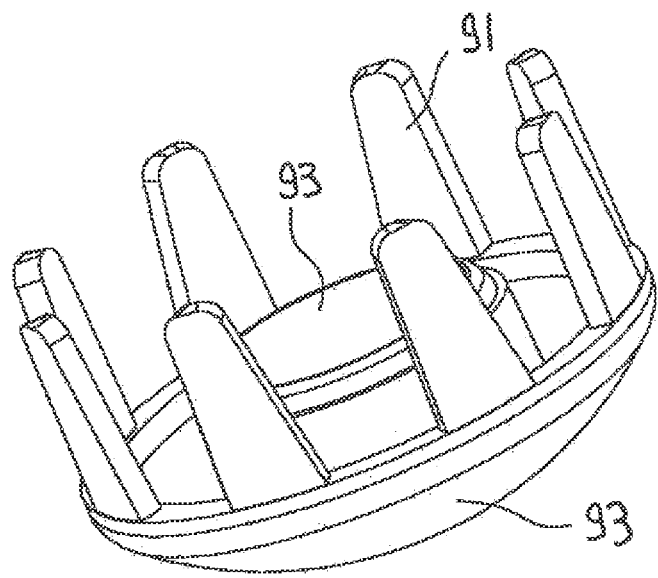
FIG. 13 shows a perspective view of the piston.

As shown in FIG. 12, the dispenser housing has an annular flange 120 with an inlet 82. The diameter of the inlet 82 may be thickened by the provision of a downward convex ring 83. After securing the flow restriction disc 65 to the annular flange 120, the flow restriction disc is co-centrically disposed with the center line of the inlet 82. When the bottle experiences a negative pressure condition when it is, for example, released by the operator, the flow restriction disc 65 will go down and leave the convex ring 83, allowing drainage to occur. The surrounding wall of the second inlet 82 may be convex in cross-section in the downward direction as shown in FIG. 9.

Figure 14:
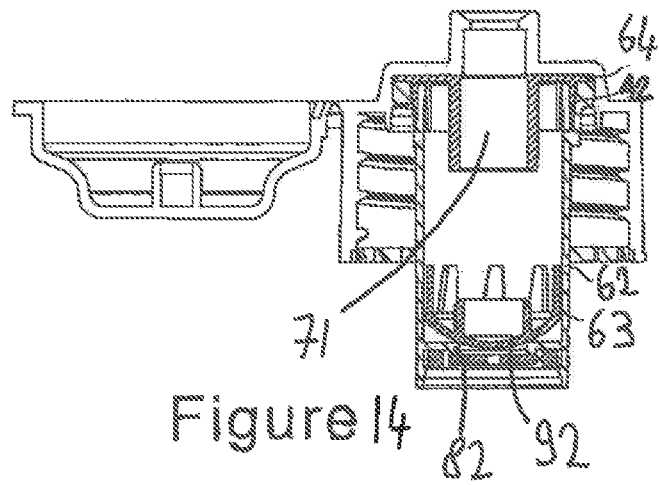
FIG. 14 shows a cross-sectional view of a further embodiment of the invention with the piston in its lowermost position.
Figure 15:
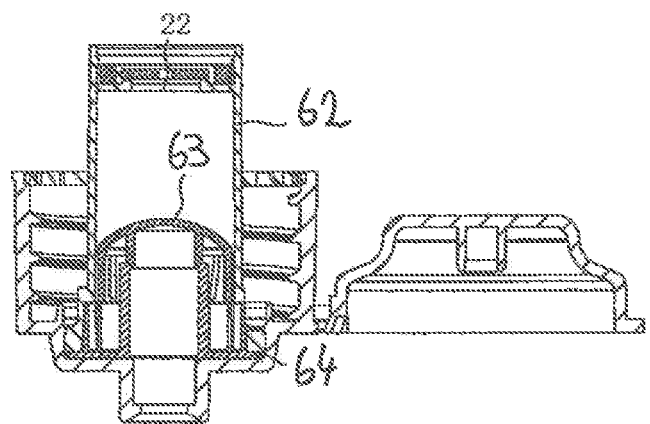
FIG. 15 shows a cross-sectional view of the piston when engaging with the valve body.
Figure 16:
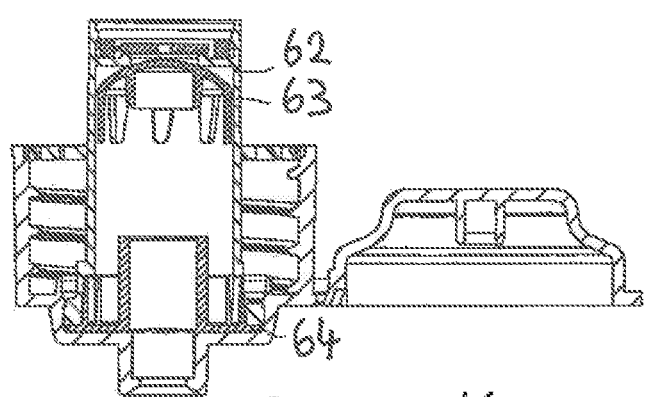
FIG. 16 shows a further cross-sectional view of the piston engaging with a platform.

In FIGS. 14, 15 and 16, the piston 63 can move up and down freely in the inner chamber 80 of the dispenser housing 62 in order to seal the first outlet 71 of the bottle cap 61 when it reaches it. The piston 63 may also seal the second inlet 82 of the dispenser housing 62 when it reaches the bottom of the chamber 80. (See FIG. 14.) The top of the piston 63 incorporates an alternative arrangement with a plurality of tabs or upward projections 91. The bottom of the piston 63 may be configured to be part spherical or domed as shown under numerical reference 92. In the central uppermost portion of the piston 63, there is provided a surface 93 that may be suitable to seal the first outlet 71 of the bottle cap 61 when the piston abuts against the boss as shown in FIG. 9. This configuration is particularly advantageous in order to allow the piston to float up faster during liquid filling. When a dispensing process is completed, air may enter the dispenser housing 62 through the first outlet 71 of the bottle cap 61. In this condition, the dispenser housing 62 typically has a certain amount of liquid inside, the air and the liquid may exit in the form of bubbles, which may take the form of bubbles 200 shown in FIG. 17. The dome 92 and the seal end 93 are configured to gather the bubbles 200, which allow the piston to float up faster to make it faster and more rapidly ready for dispensing.

In FIGS. 8, 9, 10, and 11, the elastic valve 64 is placed on the inner side of the top of the bottle cap 61. Elastic valve 64 facilitates the opening of the first outlet 71 of the dispenser housing 62 when it is under positive pressure. It also facilitates the closing of the first outlet 71 when it is in negative pressure status. Specifically, the elastic valve 64 is preferably made as a single piece of material, such as an all-in-one molded part. It has a valve body 100 with a cross valve 101, elastic projections 102 and an output pipe 103. The valve body 100 has a through-hole 401, which may take the form of a part annular aperture. The valve body 100 may have a plurality of elastic projections 102 that may be disposed about the perimeter of the valve body and radially outward from the through-hole 401. The projections 102 may extend downward from the valve body 100. The elastic projections 102 may be made of several pieces and may be of flexible construction in order to open and seal one or more first inlet such as inlet 81. Once assembled, the top edge of the valve body 100 may be retained by friction fit to the bottle cap 61 and the dispenser housing 62. The dispenser housing 62 and the bottle cap 61 may surround the valve body 100 on both sides. The elastic projections 102 may be located on the inner side of the first inlet 81 of the dispenser housing 62. Because the elastic valve 64 may be made of a soft material, the elastic projections 102 it may stick on or be displaceable from the first inlet 81 to control its opening and closing dependent upon whether or not negative or positive pressure conditions are occurring. In the positive pressure condition, the elastic projection 102 leaves the first inlet 81 and allows the liquid to flow inside the dispenser housing 62. In the negative pressure status, the elastic projections 102 stick on the first inlet 81 to prevent any liquid leaking out from the dispenser housing 62. The cross valve 101 is placed inside and connects with the through-hole 401 of the valve body 100. There is a second outlet 411 on the cross-valve 101. The top edge of the cross-valve 101 extends downward to form an output pipe or boss 103. When the bottle is upside down, and before squeezing, the cross-valve 101 ensures that there are no drips from the first outlet 71 of the bottle cap 61. Instead, in that period, the liquid fills the dispenser housing 62. A modulating orifice 89 at the bottom of the dispenser housing 62 is provided and allows liquid to go through to the inner chamber. In a preferred embodiment, there are more than one modulating orifice, which may be disposed at regular intervals around the wall of the dispenser housing 62. In preferred embodiments, the size of the modulating orifice 89 may be varied in order to control the output dosage. At the moment of squeezing and dispensing, the liquid can come into the dispenser housing 62 through the modulating orifice 89 and push the piston 63 to move downward and further push the liquid inside the dispenser housing 62 in order to exit the first outlet 71. By increasing the size of the modulating orifice 89, much more liquid may flow into the dispenser housing 62 and push the piston 63 at a much higher speed. The quicker the movement of the piston, the smaller the dosage dispensed from the dispenser. If the modulating orifice 89 is of a smaller size, there would be less flow of liquid into the dispenser housing 62 and the piston 63 would move down slower. Since this movement would be slower, a larger dose would be dispensed. In this embodiment, it is, therefore, envisaged to employ different sizes of modulating orifices 89 to control the output dose while retaining the overall relatively small size of the dispenser housing 62.

In FIG. 14, the piston 63 has fallen under gravity toward the bottom of the dispenser housing 62 and the dome 92 of the piston 63 is shown laying on the second inlet 82 of the dispenser housing 62. When placing the bottle upside down, as shown in FIG. 15, the piston 63 slides under gravity toward the first inlet 81 and the liquid inside the bottle begins to flow into the chamber 80 through the first inlet 81 and the second inlet 82. During this process, the cross valve 101 of the elastic valve 64 will seal the first outlet 71 to prevent any drips happening during the filling period of the chamber. As the liquid increases inside the dispenser housing 62, the piston 63 floats are as shown in FIG. 16. As the bottle is squeezed, the bottle is under a positive pressure condition where the elastic projections 102 of the elastic valve 64 move sufficiently to allow the liquid to flow into the dispenser housing 62 through the first inlet 81 and the second inlet 82.

Figure 17:
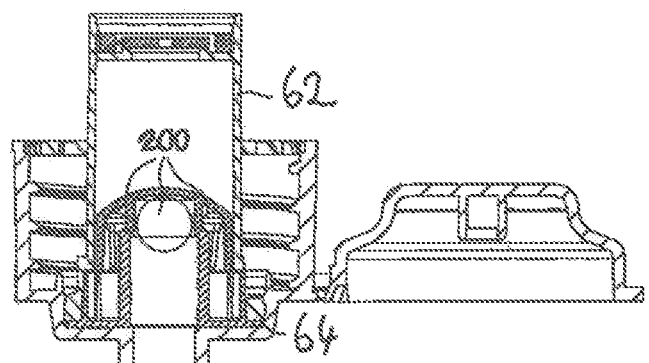
FIG. 17 shows a further embodiment in cross-section of a dosage cap.
Figure 18:
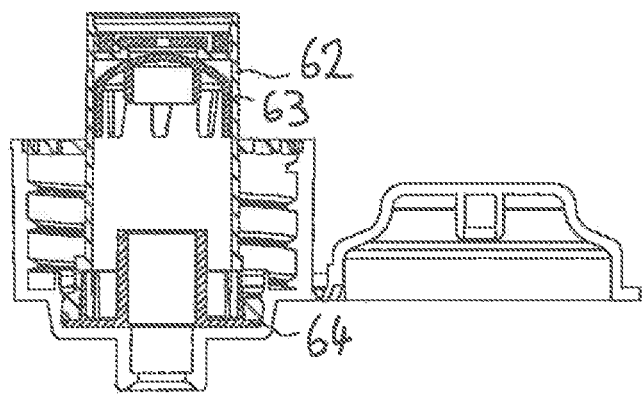
FIG. 18 shows a further embodiment in cross-section.

Consequently, these apply a force to the piston, which moves it downward. At this point, the second outlet 411 of the cross valve 101 is forced open and lets the liquid come out. The piston 63 will move to the seal end 93 and close the output pipe 103 as shown in FIG. 17, thus allowing a single dose to be dispensed. Once the bottle is released, it is in a negative pressure condition where the outside air comes through the second outlet 411 of the cross valve 101 into the dispenser housing 62. Under the negative pressure, the elastic projections 102 remain in the first inlet 81. The air inside the dispenser housing 62 is prevented from going out to the bottle through the first inlet 81 and the liquid inside the bottle cannot flow into the dispenser housing 62 through the first inlet 81. The piston 63 is forced by the air to move up while the flow restriction disc 65 is forced by the air and thereafter leaves the convex ring 83 at the bottom of the dispenser housing 62, thus allowing the air to come through the gap 113 into the bottle as shown in FIG. 18. The dome 92 of the piston 63 abuts against the second inlet 82 of the dispenser housing 62, which allows the dispenser to be ready for the next cycle of dispensing.

FIG. 19 shows a further embodiment of a dosage dispenser. In this embodiment, the piston 63 includes a floating part 343 and a floating ball 96. The floating part 343 is shaped and configured to seal the first outlet 71 of the bottle cap 61 when the piston 63 moves upward toward the top. The floating ball 96 is configured to seal the second inlet 82 when the piston 63 is located on the bottom of the dispenser housing 62.

Optionally, the floating part 343 is surrounded by a floating projection 341. At the bottom of the floating part 343, there is optionally provided an arrangement with elastic claws or tines 342. The elastic claws 342 surround the floating ball 96 while still allowing the floating ball to move up and down inside the small chamber formed by the combination of the elastic claws. A through-hole is provided in the floating part to allow the liquid to flow through. At the bottom of the floating part 343, a downwardly projecting tube is provided forming a ring 344 with an inner chamfer. This ring 344 has a relatively large diameter compared to the diameter of the through-hole in floating part 343. The inner wall of the ring 344 may be configured to be arc-shaped to follow the contours of the floating ball 96.

Figure 20:
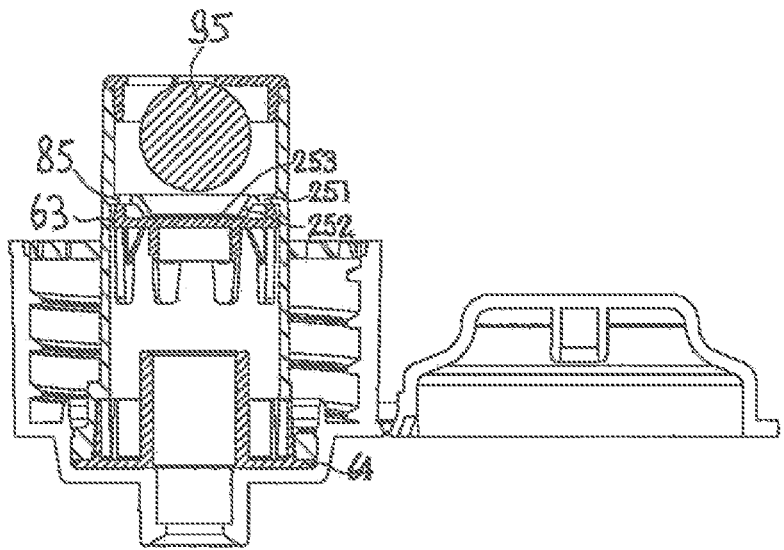
FIG. 20 shows a further embodiment of a dosage cap in cross-section with a ball located in a pressure chamber.

In the embodiment of FIG. 20, there are no elastic claws as in the embodiment of FIG. 19 whereby the floating part of piston 63 and the floating ball 96 are separate. Furthermore, the inner structure of the dispenser housing 62 is different. In this embodiment, a platform 85 extends across the width of the dispenser housing 62 and they separate the inner chamber into a pressure chamber and a dosage chamber. The floating part of piston 63 is configured to move up and down freely between a position where it abuts against the lower portion of the platform 85 and a position where the floating part engages the tube as described in previous embodiments. In this embodiment, the floating ball 96 stays in place between the platform 85 and the bottom of the dispenser housing 62. In addition, there are optionally several first through-holes 251 between the pressure chamber and the dosing chamber. The central portion of the platform 85 may incorporate a part 252 that extends toward the first outlet 71. The extension part 252 may also incorporate a second through-hole 253. A portion of the platform 85 may incorporate an arc-shaped surface configured to match the contour of at least part of the floating ball 96. The floating part of piston 63 may also incorporate a groove or a recess to accommodate the projecting part 252 as it extends in the downward direction. In use, the liquid inside the bottle may come through the first inlet 81 and through the second inlet 82 into the dispensing housing 62. This combines to cause the floating of both piston 63 and ball 96. When the bottle is squeezed in order to produce a positive pressure inside the bottle, ball 96 is forced to move down and engage with the arc-shaped surface of platform 85, which then seals the second through-hole 253.

Consequently, the liquid that would flow through through-hole 253 would now flow through through-holes 251 to the bottom of the dispenser housing 62. Floating part of the piston 63 would then move down along with the fluid. When the floating part of the piston 63 comes into contact with the first outlet 71, it forms a seal once the dose has been dispensed. Once the bottle is returned to a standing position, the outside air comes in through the first outlet 71 and the negative pressure causes the floating part of the piston 63 and the floating ball 96 to return under gravity to their original position preparing for the next dispensing cycle.

Figure 21:
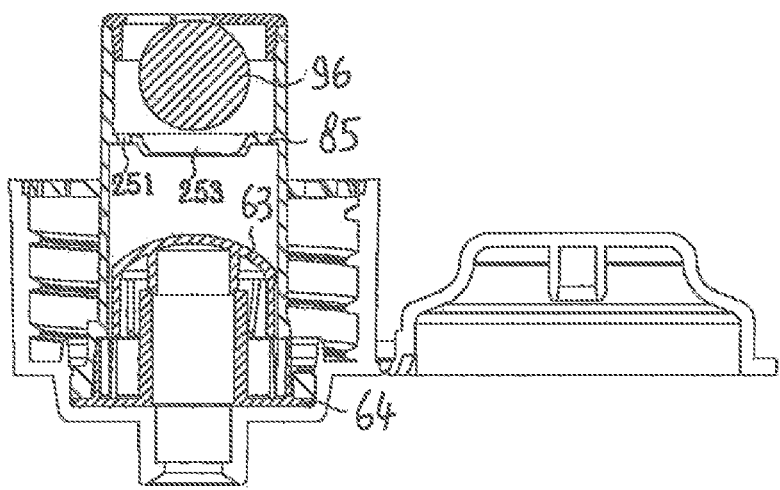
FIG. 21 shows a further embodiment where the ball valve is provided in a pressure chamber.

In the embodiment of FIG. 21, the piston 63 is of a similar configuration as that presented in the embodiment of FIGS. 14 to 16. There are, however, differences. For example, a floating ball 96 is provided between a platform 85 and a base. The platform 85 may have a similar configuration to that described in detail with regard to FIG. 20. In particular, the platform 85 may incorporate lateral apertures 251 and a central aperture 253.

The invention claimed is:

1. A dosing apparatus suitable for dispensing a dose of liquid from a resilient squeezable container, comprising:
   a cap, suitable for attachment to said container, said cap comprising an expulsion channel for the expulsion of liquid;
   a cylindrical dosage chamber attached to said cap, said dosage chamber comprising side walls extending from said cap, at least one inlet opening in said side walls proximal to said cap;
   a cylindrical pressure chamber located underneath said dosage chamber;
   a valve provided at the end of the pressure chamber distal to said dosage chamber, said valve being movable from an open position, allowing liquid to flow through one or more discharge openings, and a closed position where the valve closes the or each discharge opening, said valve incorporating at least one aperture;
   an insert with a slit valve, which is provided between said cap and said dosage chamber; and
   a plunger provided in said dosage chamber, and movable relative to said dosage chamber so as to advance upon squeezing of said container, up to a blocking position, wherein said pressure chamber has a smaller diameter than said dosage chamber in order to form a flange above the pressure chamber for said plunger to rest against,
   wherein said valve incorporates a disc attached to said pressure chamber by one or more retaining means,
   wherein said retaining means incorporates one or more tines that extend against an inner surface of said pressure chamber,
   wherein said tines incorporate a hook and said pressure chamber incorporates a lower ledge at least partially extending around an inner diameter of said pressure chamber in order to retain said tines when said valve is, in use, in an open position, the one or more discharge openings being defined in the open position between a ridge, circumference of the disc and tines, and
   wherein said disc has an upper surface that abuts, in use, against the distal extremity of said pressure chamber, closing the one or more discharge openings when in the closed position, and
   wherein said disc has a diameter greater than the external diameter of said pressure chamber, and
   wherein said insert incorporates a tubular portion projecting away from said slit valve; said plunger interacting, in use, with a lower extremity of said tubular portion when said plunger is, in use, at the end of the dosage chamber proximal to said cap.

2. The dosing apparatus according to claim 1, wherein said aperture is centrally located in said valve.

3. A container comprising a dosing apparatus according to claim 1.

4. A dosing apparatus suitable for dispensing a dose of liquid from a resilient squeezable container, comprising:
   a cap, suitable for attachment to said container, said cap comprising an expulsion channel for the expulsion of liquid;
   a cylindrical dosage chamber attached to said cap, said dosage chamber comprising side walls extending from said cap, at least one inlet opening in said side walls proximal to said cap;
   a cylindrical pressure chamber located underneath said dosage chamber;
   a valve provided at the end of the pressure chamber distal to said dosage chamber, said valve being movable from an open position, allowing liquid to flow through one or more discharge openings, and a closed position where the valve closes the or each discharge opening, said valve incorporating at least one aperture; and
   a plunger provided in said dosage chamber, and movable relative to said dosage chamber so as to advance upon squeezing of said container, up to a blocking position, wherein said pressure chamber has a smaller diameter than said dosage chamber in order to form a flange above the pressure chamber for said plunger to rest against,
   wherein said valve incorporates a disc attached to said pressure chamber by one or more retaining means,
   wherein said retaining means incorporates one or more tines that extend against an inner surface of said pressure chamber,
   wherein said tines incorporate a hook and said pressure chamber incorporates a lower ledge at least partially extending around an inner diameter of said pressure chamber in order to retain said tines when said valve is, in use, in an open position, the one or more discharge openings being defined in the open position between a ridge, circumference of the disc and tines, and
   wherein said disc has an upper surface that abuts, in use, against the distal extremity of said pressure chamber, closing the one or more discharge openings when in the closed position, and
   wherein said disc has a diameter greater than the external diameter of said pressure chamber, and
   wherein said insert includes a skirt that partially covers said inlet openings.

5. The dosing apparatus according to claim 4, wherein said aperture is centrally located in said valve.

6. A dosing apparatus suitable for dispensing a dose of liquid from a resilient squeezable container, comprising:
   a cap, suitable for attachment to said container, said cap comprising an expulsion channel for the expulsion of liquid;
   a cylindrical dosage chamber attached to said cap, said dosage chamber comprising side walls extending from said cap, at least one inlet opening in said side walls proximal to said cap;
   a cylindrical pressure chamber located underneath said dosage chamber;

a valve provided at the end of the pressure chamber distal to said dosage chamber, said valve being movable from an open position, allowing liquid to flow through one or more discharge openings, and a closed position where the valve closes the or each discharge opening, said valve incorporating at least one aperture; and a plunger provided in said dosage chamber, and movable relative to said dosage chamber so as to advance upon squeezing of said container, up to a blocking position, wherein said pressure chamber has a smaller diameter than said dosage chamber in order to form a flange above the pressure chamber for said plunger to rest against, wherein said valve incorporates a disc attached to said pressure chamber by one or more retaining means, wherein said retaining means incorporates one or more tines that extend against an inner surface of said pressure chamber, wherein said tines incorporate a hook and said pressure chamber incorporates a lower ledge at least partially extending around an inner diameter of said pressure chamber in order to retain said tines when said valve is, in use, in an open position, the one or more discharge openings being defined in the open position between a ridge, circumference of the disc and tines, and wherein said disc has an upper surface that abuts, in use, against the distal extremity of said pressure chamber, closing the one or more discharge openings when in the closed position, and wherein said disc has a diameter greater than the external diameter of said pressure chamber, and wherein said plunger incorporates a domed portion.

7. The dosing apparatus according to claim 6, wherein said aperture is centrally located in said valve.

\* \* \* \* \*